(12) United States Patent
Naya

(10) Patent No.: US 8,564,858 B2
(45) Date of Patent: Oct. 22, 2013

(54) PIXEL INTERPOLATING DEVICE, IMAGE READING APPARATUS, PIXEL INTERPOLATING METHOD AND COMPUTER-READABLE MEDIUM

(75) Inventor: Akihiko Naya, Kanagawa (JP)

(73) Assignee: Fuji Xerox Co., Ltd, Tokyo (JP)

(*) Notice: Subject to any disclaimer, the term of this patent is extended or adjusted under 35 U.S.C. 154(b) by 224 days.

(21) Appl. No.: 13/038,775

(22) Filed: Mar. 2, 2011

(65) Prior Publication Data

US 2012/0062965 A1 Mar. 15, 2012

(30) Foreign Application Priority Data

Sep. 9, 2010 (JP) ................................ 2010-201904

(51) Int. Cl.
*H04N 1/46* (2006.01)

(52) U.S. Cl.
USPC ........... 358/505; 358/501; 358/515; 382/300; 382/162

(58) Field of Classification Search
USPC .......... 358/474, 501, 505, 513, 514; 382/300, 382/261, 525, 205, 260, 162
See application file for complete search history.

(56) References Cited

U.S. PATENT DOCUMENTS

| | | | | |
|---|---|---|---|---|
| 5,587,814 | A * | 12/1996 | Mihara et al. | 358/512 |
| 6,344,906 | B1 * | 2/2002 | Gatto et al. | 358/443 |
| 6,839,081 | B1 * | 1/2005 | Iijima et al. | 348/46 |
| 6,985,760 | B2 * | 1/2006 | Hosonuma | 455/575.3 |
| 7,181,092 | B2 * | 2/2007 | Tsukioka | 382/312 |
| 7,200,286 | B2 * | 4/2007 | Matsumoto | 382/300 |
| 7,456,881 | B2 * | 11/2008 | Hu | 348/273 |
| 7,728,887 | B2 * | 6/2010 | Ueda | 348/248 |
| 7,856,139 | B2 * | 12/2010 | Chen | 382/162 |
| 7,995,839 | B2 * | 8/2011 | Tanaka et al. | 382/167 |
| 2012/0257089 | A1 * | 10/2012 | Shohara | 348/241 |
| 2013/0083220 | A1 * | 4/2013 | Imade | 348/239 |
| 2013/0094705 | A1 * | 4/2013 | Tyagi et al. | 382/103 |
| 2013/0121537 | A1 * | 5/2013 | Monobe et al. | 382/106 |

FOREIGN PATENT DOCUMENTS

| | | |
|---|---|---|
| JP | A-2003-101724 | 4/2003 |
| JP | A-2004-274573 | 9/2004 |
| JP | A-2006-304356 | 11/2006 |

* cited by examiner

*Primary Examiner* — Negussie Worku
(74) *Attorney, Agent, or Firm* — Oliff & Berridge, PLC

(57) ABSTRACT

A pixel interpolating device includes a cycle calculation unit and an interpolating unit. The cycle calculation unit calculates a cycle in change of pixel values of pixels in a document image obtained by reading a document by first and second photoelectric conversion element arrays each having a plurality of photoelectric conversion elements. The interpolating unit extracts from the pixels such pixels that an interval between each pixel and an interpolated pixel corresponding to a position between the first and second photoelectric conversion element arrays corresponds to the cycle calculated by the cycle calculation unit. The interpolating unit interpolates a pixel value of the interpolated pixel based on pixel values of the extracted pixels.

7 Claims, 9 Drawing Sheets

FIRST EMBODIMENT

THIRD EMBODIMENT

PIXEL INTERPOLATING DEVICE, IMAGE READING APPARATUS, PIXEL INTERPOLATING METHOD AND COMPUTER-READABLE MEDIUM

CROSS-REFERENCE TO RELATED APPLICATION

This application is based on and claims priority under 35 USC119 from Japanese Patent Application No. 2010-201904 filed on Sep. 9, 2010.

BACKGROUND

Technical Field

The invention relates to a pixel interpolating device, an image reading apparatus, a pixel interpolating method and a computer-readable medium.

SUMMARY

According to an aspect of the invention, a pixel interpolating device includes a cycle calculation unit and an interpolating unit. The cycle calculation unit calculates a cycle in change of pixel values of pixels in a document image obtained by reading a document by first and second photoelectric conversion element arrays each having a plurality of photoelectric conversion elements. The interpolating unit extracts from the pixels such pixels that an interval between each pixel and an interpolated pixel corresponding to a position between the first and second photoelectric conversion element arrays corresponds to the cycle calculated by the cycle calculation unit. The interpolating unit interpolates a pixel value of the interpolated pixel based on pixel values of the extracted pixels.

BRIEF DESCRIPTION OF THE DRAWINGS

Exemplary embodiments of the invention will be described in detail based on the following figures, wherein.

DETAILED DESCRIPTION

A pixel interpolating device according to a first embodiment of the invention, an image reading apparatus provided with the pixel interpolating device and a pixel interpolating program will be described below. The device, the apparatus and the program are configured so that when a pseudo gradation image of dark and light coloring expressed by a large number of small dots or cyclic patterns is read by a contact type reading portion using a plurality of photoelectric conversion element arrays, a pixel corresponding to a boundary portion between adjacent ones of the photoelectric conversion element arrays is interpolated so as to be kept continuous with pixels around the pixel.

Figure 1:
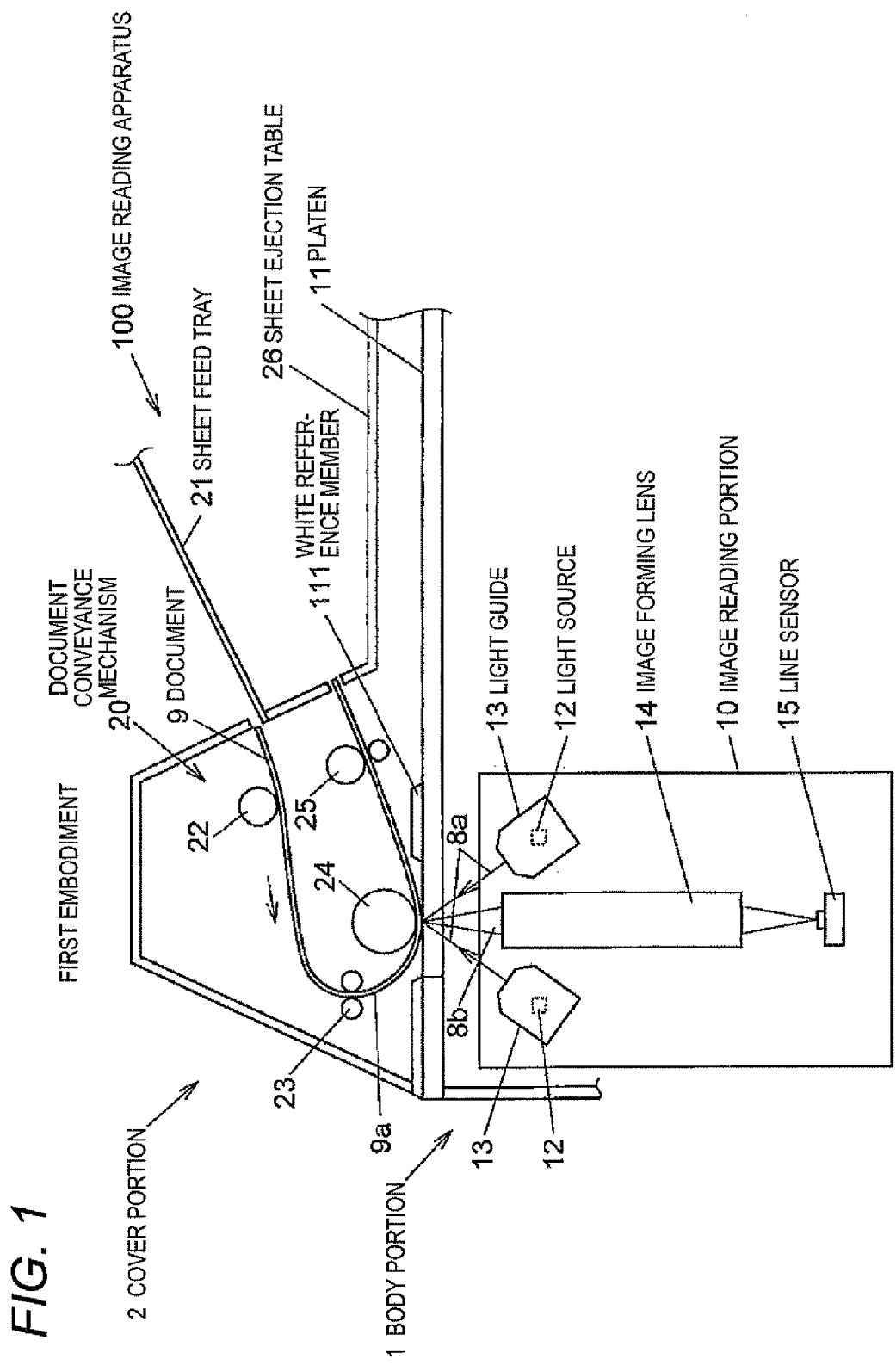
FIG. 1 is a schematic view showing an example of configuration of an image reading apparatus according to a first embodiment of the invention.

FIG. 1 is a schematic view showing an example of configuration of an image reading apparatus according to the first embodiment of the invention. The image reading apparatus 100 is incorporated in an image forming apparatus such as a copying machine, a facsimile machine, a printer, etc. The image reading apparatus 100 has a body portion 1, and a cover portion 2 capable of being opened/closed relative to the body portion 1. The image reading apparatus 100 is formed to read an image of a front surface 9a of a document 9.

The body portion 1 has: a platen 11 made of a transparent substance such as glass; light sources 12 made of light-emitting substances such as LED's; a pair of light guides 13 which guide light beams of the light sources 12 in a main scanning direction; an image forming lens 14; and a line sensor 15. The light sources 12, the light guides 13, the image forming lens 14 and the line sensor 15 form an image reading portion 10. A white reference member 111 for shading correction is disposed on a surface of the platen 11 on the side of the cover portion 2.

For example, the image forming lens 14 is made of a rod lens array having a plurality of Selfoc lenses (registered trademark) disposed in parallel to the main scanning direction. The image forming lens 14 is disposed between the document 9 and the line sensor 15. The image forming lens 14 is formed so that irradiation beams 8a irradiating the document 9 from the light sources 12 through the light guides 13 are reflected on the front surface 9a of the document 9, and reflected beams 8b obtained thus are incident on the image forming lens 14 and converged as an image on a plurality of photoelectric conversion elements of the line sensor 15. The configuration of the line sensor 15 will be described later.

The cover portion 2 has a sheet feed tray 21, a document separation roll 22, a document conveyance roll 23, a reading roll 24, an ejection roll 25, and a sheet ejection table 26. The cover portion 2 is disposed above the body portion 1.

The document separation roll 22, the document conveyance roll 23, the reading roll 24 and the ejection roll 25 form a document conveyance mechanism 20 which conveys the document 9 from the sheet feed tray 21 to the sheet ejection table 26 via a document reading position between the reading roll 24 and the platen 11.

Figure 2:
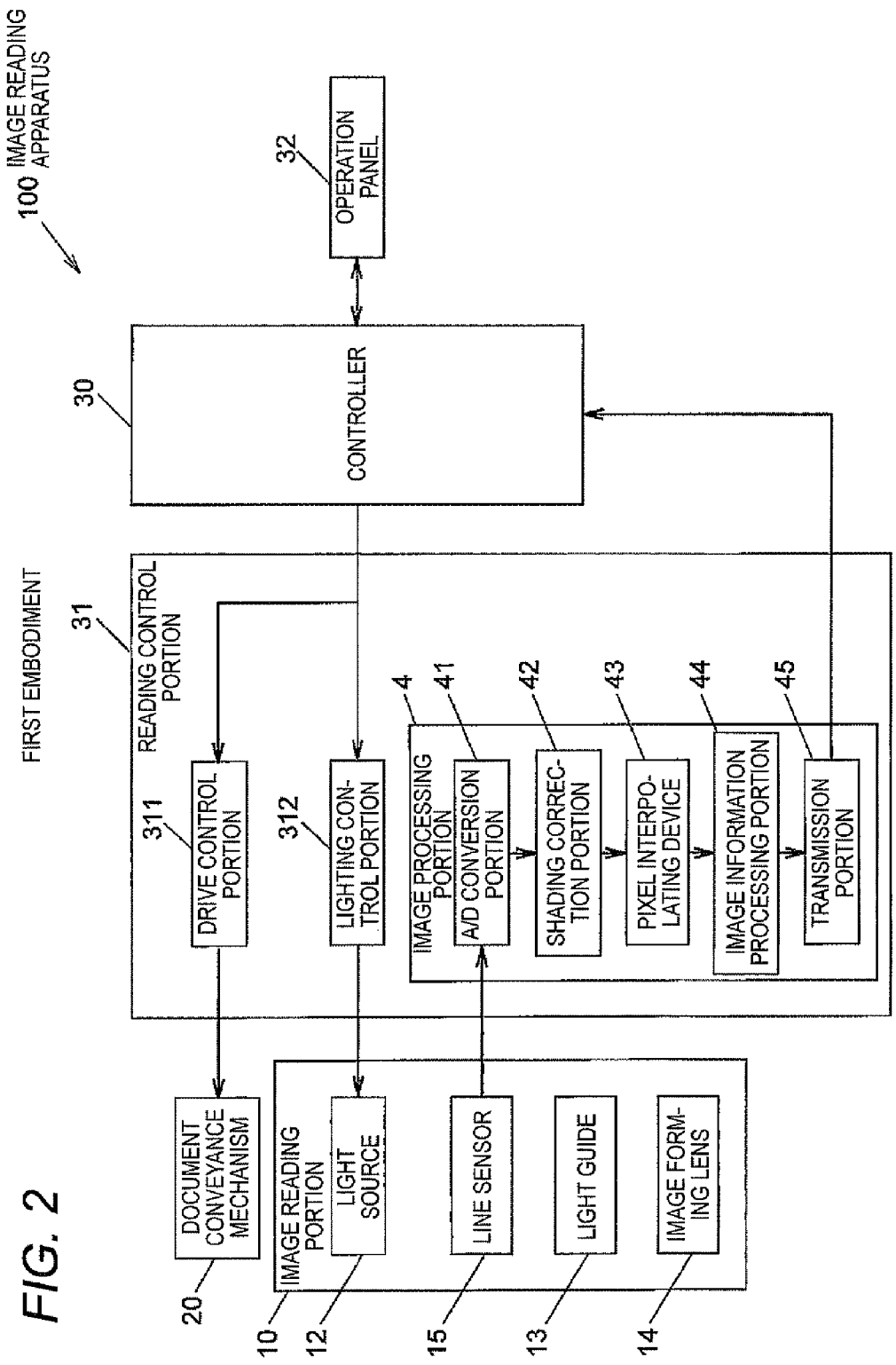
FIG. 2 is a configuration diagram showing an example of overall configuration of the image reading apparatus.

FIG. 2 is a configuration diagram showing an example of overall configuration of the image reading apparatus 100. The image reading apparatus 100 has an image reading portion 10, a document conveyance mechanism 20, a controller 30 for generally controlling the image reading apparatus 100, a reading control portion 31 for controlling reading an image of the document 9, and an operation panel 32 capable of inputting operation instructions, various kinds of settings, etc. based on user's operation.

The reading control portion 31 has a drive control portion 311 for driving the respective rolls constituting the document conveyance mechanism 20, a lighting control portion 312 for controlling lighting of the light sources 12, and an image processing portion 4 for performing image processing based on a signal indicating a read result of the document read by the line sensor 15.

The image processing portion 4 has an A/D conversion portion 41 which accepts an output signal of the line sensor 15, a shading correction portion 42 for performing shading correction to correct variation in sensitivity of photoelectric conversion elements, a pixel interpolating device 43 for setting pixel values of interpolated pixels (which will be described later), an image information processing portion 44 for generating image information as a read result of the document 9 to be outputted to the controller 30, based on information of pixel values of pixels including the interpolated pixels whose pixel values are set by the pixel interpolating device 43, and a transmission portion 45 for transmitting the image information to the controller 30. The configuration of the pixel interpolating device 43 will be described later.

The A/D conversion portion 41 converts output signals (analog signals) of the photoelectric conversion elements provided in the line sensor 15 into digital signals, sets pixel values of pixels corresponding to respective reading positions of the document 9, and generates a document image constituted by these pixels.

The shading correction portion 42 corrects pixel values of respective pixels in the read image of the document 9 based on output values of the respective photoelectric conversion elements at reading reflected beams of the white reference member 111 (see FIG. 1) and output values of the respective photoelectric conversion elements without irradiation of the document 9 with the light sources 12, and supplies the corrected pixel values to the pixel interpolating device 43. The A/D conversion portion 41 and the shading correction portion 42 are provided as an example of a supply portion which supplies information of pixel values of pixels in a document image to the pixel interpolating device 43.

For example, the controller 30 outputs the image information received from the image processing portion 4 to an image forming portion of a copying machine to thereby print an image on a sheet of paper or outputs the image information to a computer, a storage medium, etc. connected to the image reading apparatus 100 by a communication line.

Figure 3A:
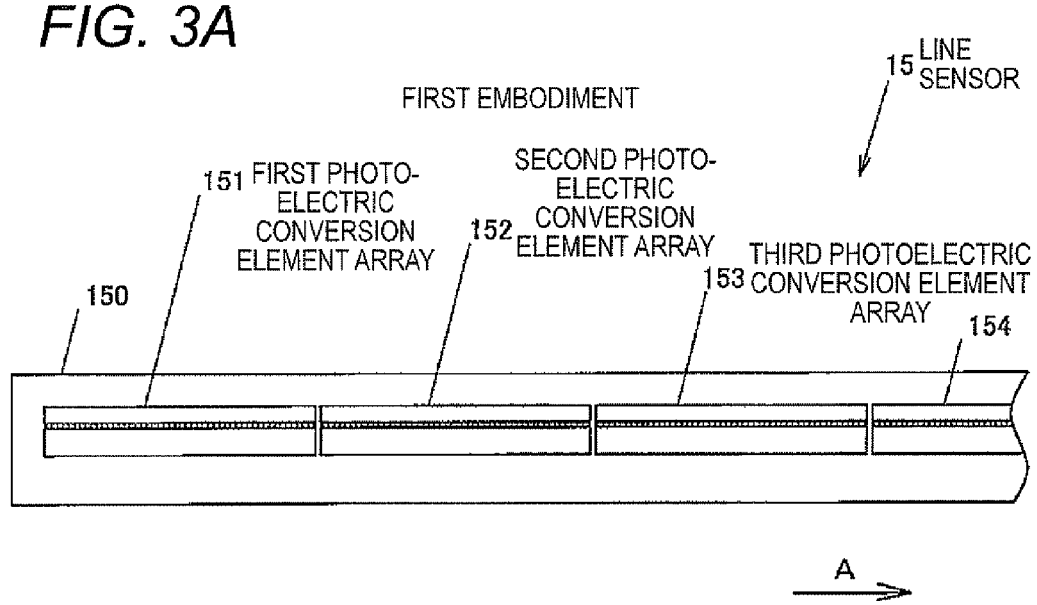
FIGS. 3A and 3B show the configuration of a line sensor, FIG. 3A being a view showing a part of the line sensor, FIG. 3B being an enlarged view showing a boundary portion between adjacent photoelectric conversion element arrays shown in FIG. 3A.

FIG. 3A is a view showing an example of configuration of part of the line sensor 15. The line sensor 15 has a printed board 150, a first photoelectric conversion element array 151, a second photoelectric conversion element array 152, a third photoelectric conversion element array 153, a fourth photoelectric conversion element array 154, . . . . The photoelectric conversion element arrays 151, 152, 153, 154, . . . are mounted in the printed board 150 and disposed along a main scanning direction represented by the arrow A. For example, eighteen photoelectric conversion element arrays are mounted in the printed broad 150.

Figure 3B:
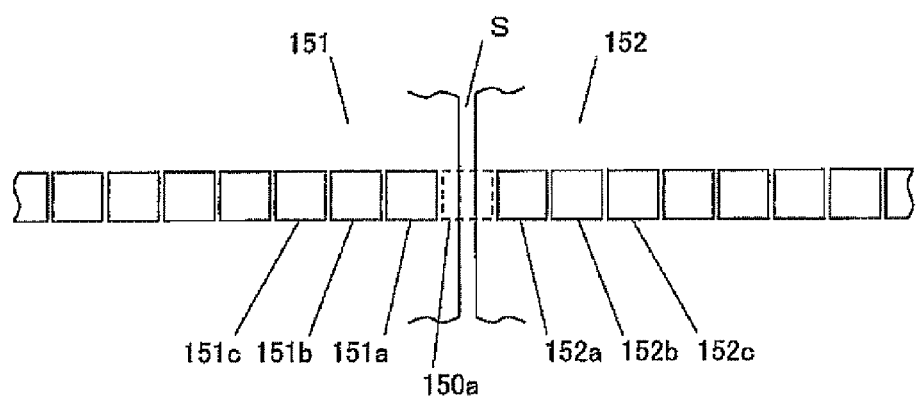

FIG. 3B is an enlarged view showing a region between the first photoelectric conversion element array 151 and the second photoelectric conversion element array 152 in FIG. 3A. The first photoelectric conversion element array 151 and the second photoelectric conversion element array 152 are disposed so as to be adjacent to each other through a space S.

The first photoelectric conversion element array 151 has a first photoelectric conversion element 151a, a second photoelectric conversion element 151b, a third photoelectric conversion element 151c, . . . provided along the main scanning direction in order of position closer to the space S. Similarly, the second photoelectric conversion element array 152 has a first photoelectric conversion element 152a, a second photoelectric conversion element 152b, a third photoelectric conversion element 152c, . . . provided along the main scanning direction in order of position closer to the space S. Each of the first and second photoelectric conversion element arrays 151 and 152 has 500 to 1000 photoelectric conversion elements. For example, the photoelectric conversion elements are arranged at intervals of 20 to 100 μm.

Although the first photoelectric conversion element 151a, the second photoelectric conversion element 151b, the third photoelectric conversion element 151c, . . . in the first photoelectric conversion element array 151 and the first photoelectric conversion element 152a, the second photoelectric conversion element 152b, the third photoelectric conversion element 152c, . . . in the second photoelectric conversion element array 152 are arranged at equal intervals, an interval between the first photoelectric conversion element 151a of the first photoelectric conversion element array 151 and the first photoelectric conversion element 152a of the second photoelectric conversion element array 152 is larger than the interval between adjacent ones of the other photoelectric conversion elements.

In the example shown in FIG. 38, a distance where one photoelectric conversion element can be disposed is formed between the first photoelectric conversion element 151a of the first photoelectric conversion element array 151 and the first photoelectric conversion element 152a of the second photoelectric conversion element array 152.

The image reading portion 10 including the line sensor 15 reads the document 9 as an image constituted by pixels arranged in a main scanning direction and a sub scanning direction. For this reason, when, for example, a dot image with dark and light coloring expressed in such a manner that a photograph or picture is expressed as a set of small points (dots) while the size or density thereof is changed is read, columns of pixels which cannot be read by the photoelectric conversion elements are generated along the sub scanning direction because of lack of photoelectric conversion elements between the photoelectric conversion element arrays.

As a result, a number of linear discontinuous portions corresponding to the number of spaces S between the photoelectric conversion element arrays are generated along the sub scanning direction, so that quality of the read image deteriorates. Therefore, the pixel interpolating device 43 interpolates and sets pixel values of pixels not read by the photoelectric conversion elements to keep the pixels continuous with pixels around the pixels. In the following description about the image of the document 9, pixels having pixel values set by the pixel interpolating device 43 are referred to as interpolated pixels while pixels having pixel values set in accordance with output signals of the photoelectric conversion elements are referred to as read pixels.

Figure 4:
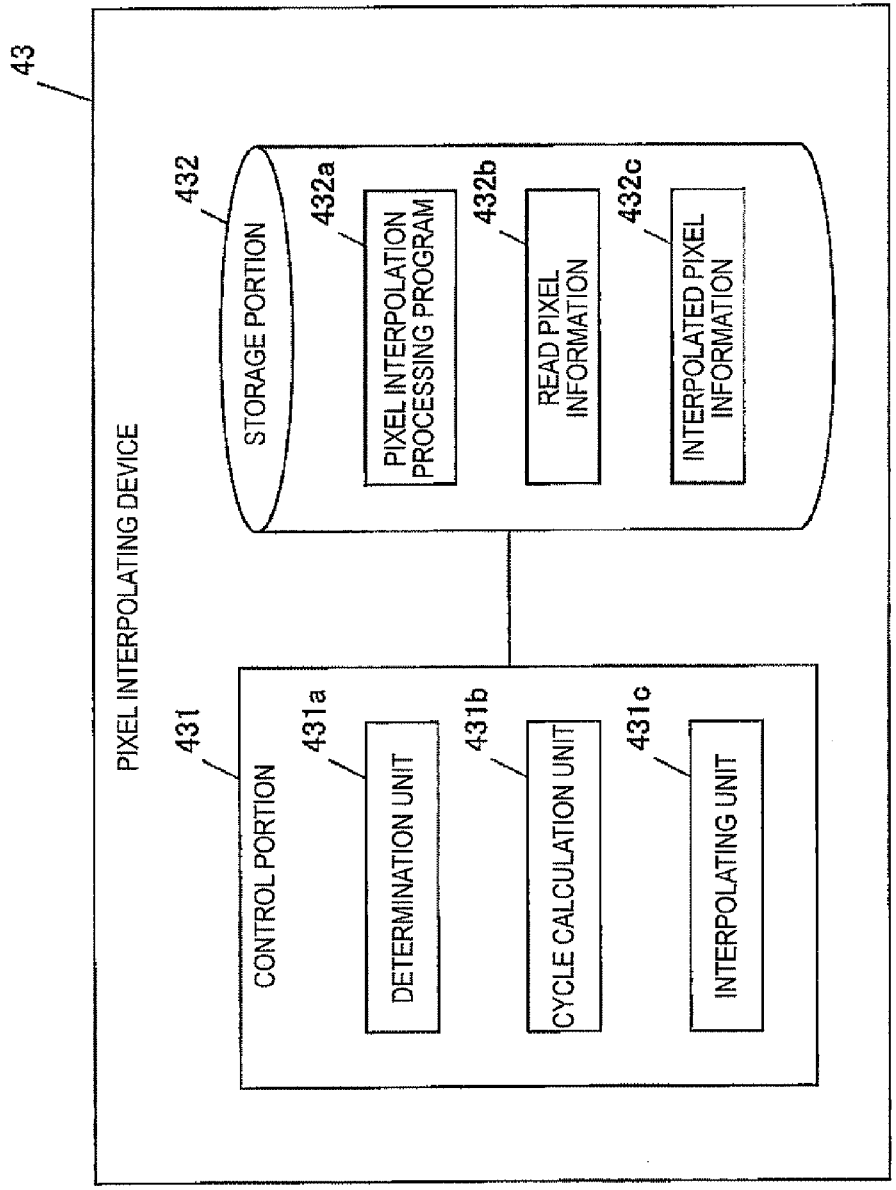
FIG. 4 is a diagram showing an example of configuration of an image interpolating device.

FIG. 4 is a diagram showing an example of configuration of the pixel interpolating device 43. The pixel interpolating device 43 has a control portion 431 constituted by a CPU (Central Processing Unit), etc., and a storage portion 432 constituted by an ROM (Read Only Memory), an RAM (Random Access Memory), etc.

The control portion 431 operates based on a pixel interpolation processing program 432a stored in the storage portion 432 to thereby serve as a determination unit 431a, a cycle calculation unit 431b and an interpolating unit 431c.

The storage portion 432 stores read pixel information 432b and interpolated pixel information 432c besides the pixel interpolation processing program 432a.

The determination unit 431a acquires pixel values of read pixels along the main scanning direction in peripheral portions of reading positions of the document 9 corresponding to interpolated pixels, stores the pixel values of the read pixels as read pixel information 432b, and determines whether the pixel values of the read pixels change repeatedly along the main scanning direction or not.

The cycle calculation unit 431b calculates the cycle of the change based on the pixel values of the read pixels when the determination unit 431a determines that the pixel values of the read pixels change repeatedly along the main scanning direction.

The interpolating unit 431c extracts read pixels whose intervals from interpolated pixels correspond to the cycle calculated by the cycle calculation unit 431b, from the read pixels, calculates pixel values of interpolated pixels based on the pixel values of the extracted pixels, and stores the calculated pixel values of the interpolated pixels as interpolated pixel information 432c.

On the other hand, when the determination unit 431a determines that the pixel values of the read pixels do not change repeatedly along the main scanning direction, the interpolating unit 431c sets pixel values of interpolated pixels at values between pixel values of pixels on opposite sides of the interpolated pixels along the main scanning direction, and stores the pixel values of the interpolated pixels as interpolated pixel information 432c.

The operation of the pixel interpolating device 43 will be described below more in detail with reference to FIGS. 1 to 5.

Figure 5:
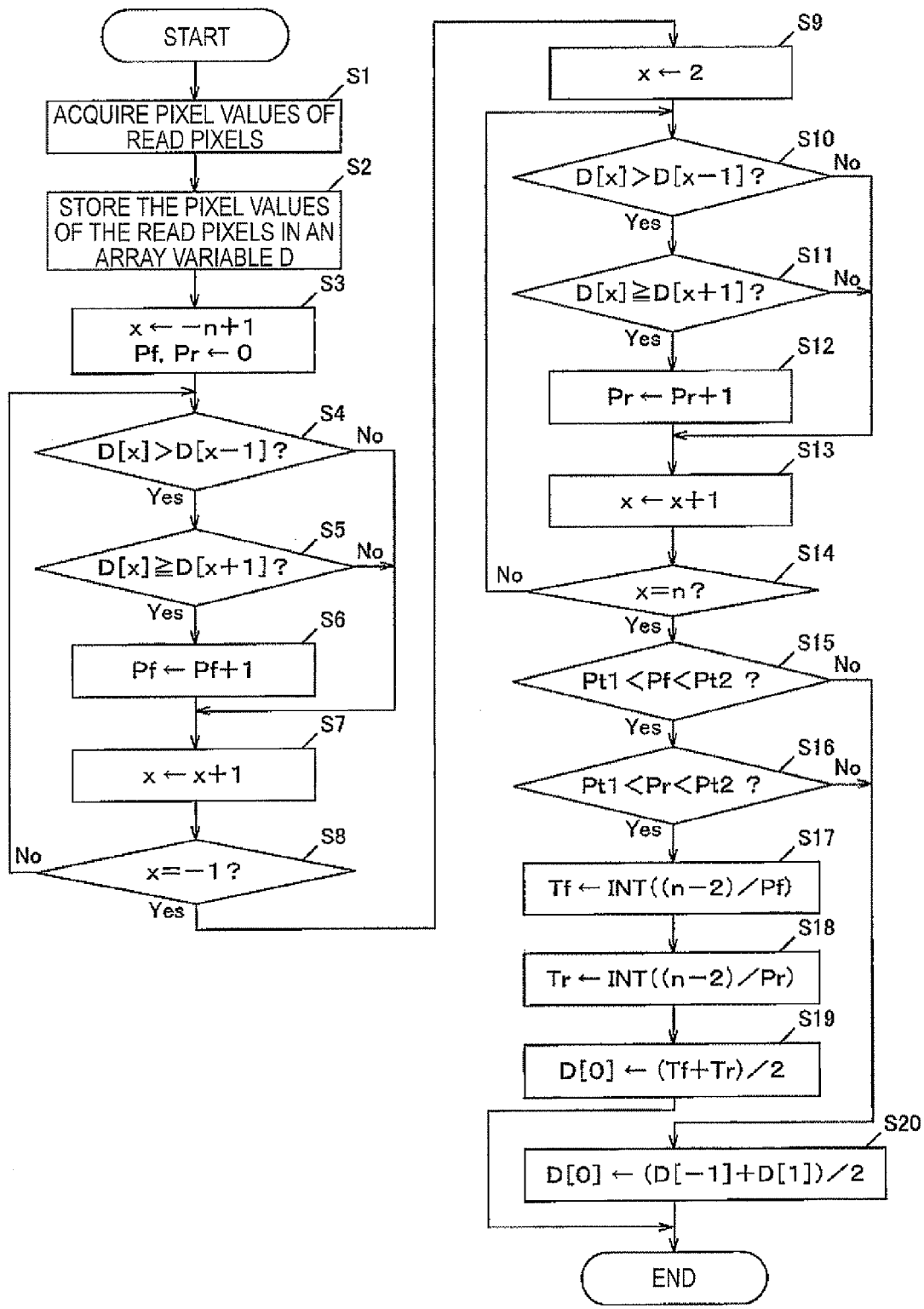
FIG. 5 is a flow chart showing an example of processing executed by a control portion of the image interpolating device.

FIG. 5 is a flow chart showing an example of processing executed by the control portion 431 of the pixel interpolating device 43.

First, the determination unit 431a acquires information of pixel values of a row of read pixels in the main scanning direction after shading correction from the shading correction portion 42 (step S1).

Then, the determination unit 431a stores pixel values of read pixels in peripheral portions on opposite sides along the main scanning direction with respect to reading positions corresponding to interpolated pixels in the acquired information of the pixel values of the read pixels, as read pixel information 432b in an array variable D (step S2).

In the step S2, a pixel value of each interpolated pixel is stored as D[0], and pixel values of n read pixels in a first direction along the main scanning direction are stored as D[1], D[2], . . . , D[n] in order of position closer to the interpolated pixel. In addition, pixel values of n read pixels in a second direction opposite to the first direction are stored as D[−1], D[−n] in order of position closer to the interpolated pixel. Here, n is a constant of a natural number not smaller than 3.

The constant n is preferably set to be equal to the number of pixels in a width range of 0.5 to 1.0 mm along the main scanning direction of the photoelectric conversion elements. If the width range is too large, accuracy of interpolation may be lowered because an image of a pattern different from a dot pattern in the peripheral portion of each interpolated pixel is referred to. This embodiment will be described in the case of n=34. D[−n+1] to D[−2] and D[2] to D[n−1] are a retrieval range for retrieving extreme values (which will be described later) of pixel values.

When, for example, an interpolated pixel 150a between the first photoelectric conversion element array 151 and the second photoelectric conversion element array 152 as shown in FIG. 3B is to be subjected to interpolation processing, a pixel value based on an output signal of the first photoelectric conversion element 152a of the second photoelectric conversion element array 152 is set as D[1], a pixel value based on an output signal of the second photoelectric conversion element 152b is set as D[2], . . . . On the other hand, a pixel value based on an output signal of the first photoelectric conversion element 151a of the first photoelectric conversion element array 151 is set as D[−1], a pixel value based on an output signal of the second photoelectric conversion element 151b is set as D[−2], . . . .

Then, the determination unit 431a assigns (−n+1) to a variable x and initializes variables Pf and Pr to zero (step S3). Here, the variable Pf is a counter value indicating the number of extreme values contained in n−2 variables D[−n+1] to D[−2] whereas the variable Pr is a counter value indicating the number of extreme values contained in n−2 variables D[2] to D[n−1].

Although description will be made below in the case where the pixel value of a central read pixel is counted as an extreme value (local maximum value) when the pixel value of the central read pixel is the largest in pixel values of three read pixels continuous along the main scanning direction, the pixel value of a central read pixel may be counted as an extreme value (local minimum value) when the pixel value of the central read pixel is the smallest. That is, the term "extreme value" means a pixel value at a point where the pixel value changes from increasing to decreasing or from decreasing to increasing when pixel values of pixels are viewed along a scanning direction.

Then, the determination unit 431a determines whether D[x]>D[x−1] is true or not (step S4). When the determination concludes "Yes", the determination unit 431a further determines whether D[x]≥D[x+1] is true or not (step S5). When the determination in the step S5 concludes "Yes", the determination unit 431a increments the variable Pf because D[x] is an extreme value (step S6). On the other hand, when the determination in the step S4 or S5 concludes "No", the determination unit 431a does not increment the variable Pf.

Then, the determination unit 431a increments x (step S7), and determines whether x as a result of the increment is −1 or not (step S8). When the determination in the step S8 concludes "No", processing in and after the step S4 is executed again.

On the other hand, when the determination in the step S8 concludes "Yes", the determination unit 431a assigns 2 to x (step S9), and determines whether D[x]>D[x−1] is true or not (step S10). When the determination concludes "Yes", the determination unit 431a further determines whether D[x]≥D [x+1] is true or not (step S11).

When the determination in the step S11 concludes "Yes", the determination unit 431a increments the variable Pr because D[x] is an extreme value (step S12). On the other hand, when the determination in the step S10 or S11 concludes "No", the determination unit 431a does not increment the variable Pr.

Then, the determination unit 431a increments x (step S13), and determines whether x as a result of the increment is equal to n or not (step S14). When the determination in the step S14 concludes "No", processing in and after the step S10 is executed again.

On the other hand, when the determination in the step S14 concludes "Yes", the determination unit 431a determines whether the variable Pf is larger than a first threshold Pt1 and smaller than a second threshold Pt2 (Pt1<Pf<Pt2 is true) or not (step S15). For example, the first threshold Pt1 and the second threshold Pt2 may be set to be equal to 2 and 11, respectively.

When the determination in the step S15 concludes "Yes", the determination unit 431a further determines whether the variable Pr is larger than the first threshold Pt1 and smaller than the second threshold Pt2 (Pt1<Pr<Pt2 is true) or not (step S16). A result of the determination in the step S16 shows a result of the determination performed by the determination unit 431a. That is, when the determination in the step S16 concludes "Yes", the determination unit 431a determines that the pixel values of the read pixels change repeatedly and cyclically along the main scanning direction. On the other hand, when the determination in the step S15 or S16 concludes "No", the determination unit 431a determines that the pixel values of the read pixels do not change repeatedly and cyclically along the main scanning direction.

When the determination in the step S16 concludes "Yes", the cycle calculation unit 431b and the interpolating unit 431c set the pixel value of the interpolated pixel D[0] by the following process.

The cycle calculation unit 431b assigns the quotient obtained by dividing the number (n−2) of read pixels subjected to the processing of the steps S4 to S8 for determining whether each read pixel is an extreme value or not, by the variable Pf to a variable Tf (step S17). The variable Tf is a positive integer. When n−2 cannot be divided by the variable Pf, the figures below the decimal point are omitted so that the quotient is rounded down to an integer. Alternatively, the quotient may be rounded off to the nearest whole number or rounded up to an integer. The variable Tf is equivalent to an average cycle in change of pixel values in a range of from D[−n+1] to D[−2].

The cycle calculation unit 431b assigns the quotient obtained by dividing the number (n−2) of read pixels determined as extreme values in the processing of the steps S10 to S14 by a variable Pr, to a variable Tr (step S18). The variable Tr is a positive integer. When n−2 cannot be divided by the variable Pr, the figures below the decimal point are omitted so that the quotient is rounded down to an integer. Alternatively, the quotient may be rounded off to the nearest whole number or rounded up to an integer. The variable Tr is equivalent to an average cycle in change of pixel values in a range of from D[2] to D[n−1].

Then, the interpolating unit 431c calculates an average value of D[−Tf] and D[Tr] and stores the average value as interpolated pixel information 432c indicating the pixel value of an interpolated pixel, in D[0] (step S18).

On the other hand, when the determination in the step S15 or S16 concludes "No", the interpolating unit 431c calculates an average value of D[−1] and D[1] and stores the average value as the pixel value of an interpolated pixel in D[0] (step S20).

By the aforementioned processing, the pixel value of the interpolated pixel is stored in D[0]. Information of the pixel value of the interpolated pixel is delivered together with information of the pixel values of read pixels to the image information processing portion 44 which is a portion following the pixel interpolating device 43 in the image processing portion 4 (see FIG. 2).

An example of operation of the pixel interpolating device 43 will be described below more specifically with reference to FIGS. 6A to 6C.

Figure 6A:
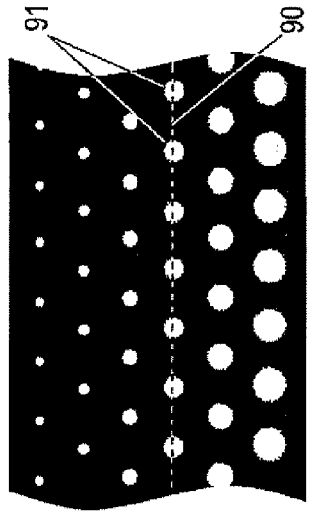
FIG. 6A shows an example of an image of a document read by the image reading apparatus.

FIG. 6A shows an example of an image of the document 9 read by the image reading apparatus 100. This image is a dot image as a kind of pseudo gradation image which is formed in such a manner that a large number of dots 91 different in size are arranged with density changed two-dimensionally to thereby express dark and light coloring. The case where this dot image is read based on a reading line along a main scanning direction represented by the broken line 90 to thereby perform interpolation processing will be described here.

Figure 6B:
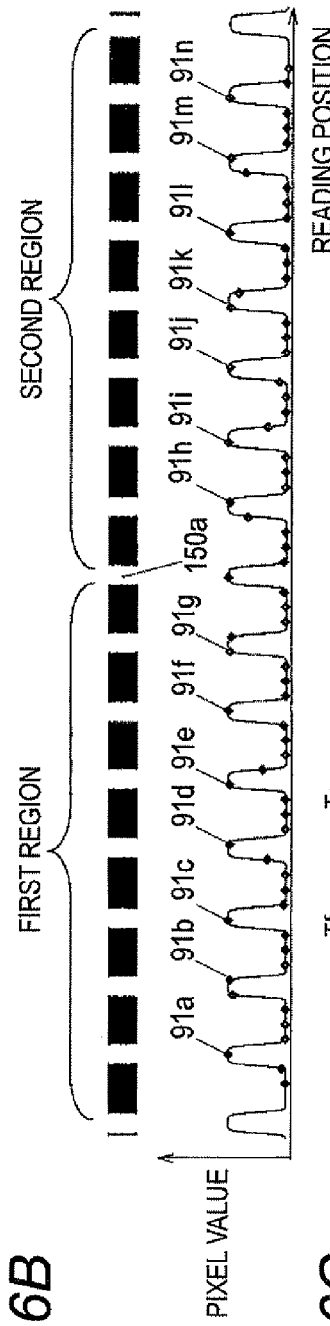
FIG. 6B is a graph showing pixel values of pixels along a reading line together with dark and light coloring in reading places.

FIG. 6B is a graph showing pixel values of pixels along the reading line 90 together with dark and light coloring of reading places. The pixel values are set so that the pixel value of a pixel becomes higher as the pixel becomes closer to white.

In FIG. 6B, a region on the left of an interpolated pixel 150a is a first region read by the first photoelectric conversion element array 151 whereas a region on the right of the interpolated pixel 150a is a second region read by the second photoelectric conversion element array 152.

In steps S4 and S5 in the flow chart shown in FIG. 5, seven extreme values designated by the reference numerals 91a to 91g in FIG. 6B are detected. In steps S10 and S11, seven extreme values designated by the reference numerals 91h to 91n in FIG. 6B are detected. Accordingly, both the variables Pf and Pr take a value of 7. When the first threshold Pt1 is 2 and the second threshold Pt2 is 11 as described in the aforementioned example, the determination in the step S15 concludes "Yes", that is, determination is made that the pixel values of the read pixels change cyclically along the main scanning direction.

In the processing of the step S17, the interpolating unit 431c assigns a value (4) obtained by rounding the quotient (32/7≈4.57) obtained by dividing an arithmetic operation result (32) of n−2 by the variable Pf, to the variable Tf as a cycle period in the first region. In the processing of the step S18, the interpolating unit 431c assigns a value (4) obtained by rounding the quotient (32/7≈4.57) obtained by dividing an arithmetic operation result (32) of n−2 by the variable Pr, to the variable Tr as a cycle period in the second region.

In the processing of the step S19, the interpolating unit 431c calculates an average value of D[−Tf](=D[−4] and D[Tr](=D[4])) and assigns the average value to D[0] as the pixel value of the interpolated pixel.

Figure 6C:
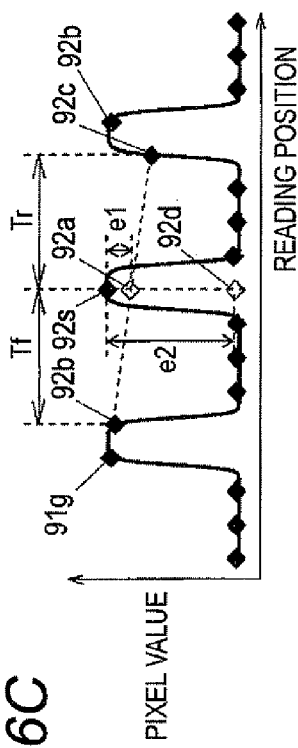
FIG. 6C is an enlarged view showing the periphery of a portion corresponding to an interpolated pixel in the graph of FIG. 6B.

FIG. 6C is an enlarged view showing the periphery of a portion corresponding to the interpolated pixel in the graph of FIG. 6B. In FIG. 6C, the pixel value 92a of the interpolated pixel is calculated based on calculation of an average value of a pixel value 92b of a read pixel in a position shifted by (cycle (4)×pixel interval) represented by the variable Tf from the position of the interpolated pixel toward the first region and a pixel value 92c of a read pixel in a position shifted by (cycle (4)×pixel interval) represented by the variable Tr from the position of the interpolated pixel toward the second region.

On the other hand, when the pixel value of the interpolated pixel is calculated based on an average of pixel values (D[−1] and D[1]) of read pixels on opposite sides of the interpolated pixel in the main scanning direction, the pixel value of the interpolated pixel is a value represented by the pixel value 92d.

If a pixel value 92s of the interpolated pixel is read by a photoelectric conversion element so that the pixel values 92a and 92d are compared with the pixel value 92s, an error e1 in the pixel value 92a becomes smaller than an error e2 in the pixel value 92d. That is, when the image of the document 9 is reproduced based on pixel values, dots can be reproduced in the case where the interpolation processing according to this embodiment is performed, but dots may disappear in the case where interpolation is performed in such a manner that pixels in the front and rear of the interpolated pixel in the main scanning direction are averaged.

Although this embodiment has been described above with reference to FIGS. 1 to 6, this embodiment may be modified as follows.

Although the flow chart shown in FIG. 5 shows the case where the pixel value of the interpolated pixel is calculated by averaging pixel values of two pixels which are located on opposite sides of the interpolated pixel along the main scanning direction so as to be distant by one cycle from the interpolated pixel, the embodiment is not limited thereto and the pixel value of the interpolated pixel may be set as a value between the pixel values of the two pixels. For example, a weighted average value obtained by weighting higher one (or lower one) of the pixel values of the two pixels may be used as the pixel value of the interpolated pixel.

Although the flow chart shown in FIG. 5 shows the case where the pixel value of the interpolated pixel is calculated by averaging pixel values of two pixels which are located on opposite sides of the interpolated pixel along the main scanning direction so as to be distant by one cycle from the interpolated pixel, the embodiment is not limited thereto and the pixel value of the interpolated pixel may be calculated by averaging pixel values of two pixels distant by two cycles from the interpolated pixel. Alternatively, an average value of pixel values of two pixels distant by one cycle from the interpolated pixel and pixel values of two pixels distant by two cycles from the interpolated pixel, that is, an average value of four pixels, may be used as the pixel value of the interpolated pixel. Further alternatively, the pixel value of the interpolated pixel may be obtained by referring to pixel values of pixels distant by two or more cycles from the interpolated pixel.

Although the embodiment has been described in the case where the pixel value of the interpolated pixel is set based on pixel values of read pixels on opposite sides of the interpolated pixel along the main scanning direction, the pixel value of the interpolated pixel may be set based on a pixel value of a read pixel only on one side along the main scanning direction. For example, when one of the variables Pf and Pr in the flow chart shown in FIG. 5 satisfies the condition that the variable is larger than the first threshold Pt1 and smaller than the second threshold Pt2 but the other variable does not satisfy this condition, the pixel value of the interpolated pixel may be set based on the pixel value of the read pixel only one side along the main scanning direction which satisfies this condition.

Although the embodiment has been described in the case where cyclic change of pixel values is judged based on the number of extreme values, the embodiment is not limited thereto. For example, cyclic change of pixel values may be judged based on the number of times by which each pixel value changes to exceed a predetermined threshold.

Although the embodiment has been described in the case where the cycle period of change of pixel values is expressed based on the number of pixels, the embodiment is not limited thereto. For example, the cycle of change in brightness of an image of the document 9 in the main scanning direction may be calculated, for example, in the order of μm based on pixel values of read pixels so that the cycle period of change of pixel values can be expressed in length. In this case, interpolation processing is performed based on pixel values of read pixels in positions corresponding to the length of the cycle.

Although the embodiment has been described in the case where the cycle is calculated by dividing the number of pixels in a range for searching for extreme values by the number of extreme values, a correspondence table indicating correspondence of the number of extreme values and the cycle may be stored in the storage portion 432 in advance so that the cycle can be obtained by referring to the correspondence table.

Next, a second embodiment of the invention will be described with reference to FIG. 7. Although the first embodiment has been described in the case where the function of the pixel interpolating device is achieved by processing of a CPU or the like operated according to an image processing program, this embodiment is configured in the same manner as the first embodiment except that the function of the pixel interpolating device is achieved by combination of circuit elements without provision of any program.

Figure 7:
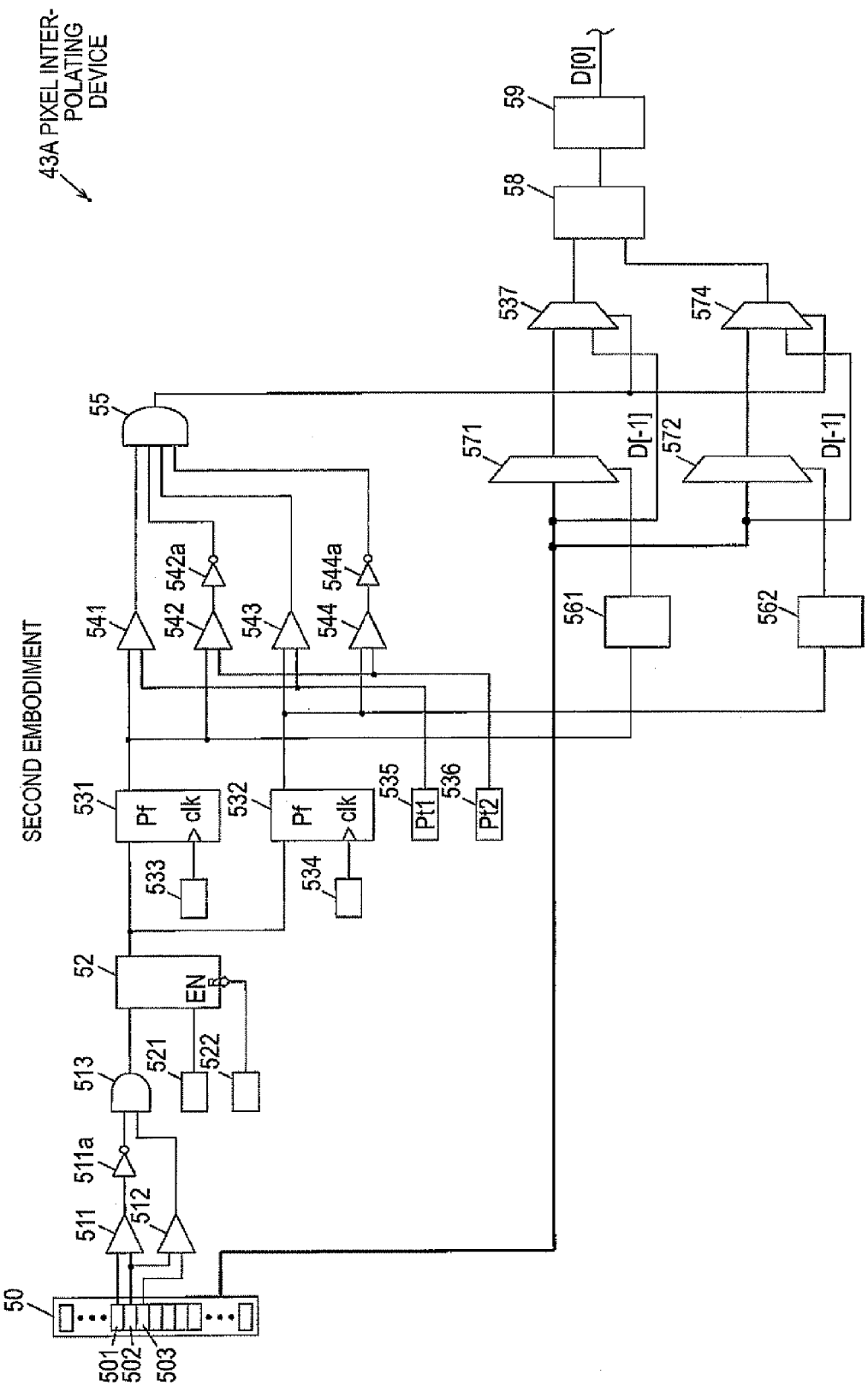
FIG. 7 is a diagram showing an example of configuration of a pixel interpolating device according to a second embodiment of the invention.

FIG. 7 is a diagram showing an example of circuit configuration of a pixel interpolating device 43A according to this embodiment. The pixel interpolating device 43A includes a shift register 50, and circuit elements. Pixel values of read pixels in the periphery of each interpolated pixel are stored in the shift register 50. The circuit elements operate based on the values stored in the shift register 50.

The shift register 50 is formed so that information of pixel vales of read pixels is stored in respective register elements of the shift register 50 so as to be arranged sequentially along the main scanning direction, and that the contents of the respective register elements are shifted to the rear stage side at intervals of a predetermined time. That is, whenever a predetermined time has passed, the contents stored in the first register element 501 of the shift register 50 are moved to the second register element 502 while the contents stored in the second register element 502 are moved to the third register element 503.

The values of the array variable D[x] in the first embodiment are stored in the respective register elements of the shift register 50. In D[x], x is an argument of the array variable which can take a value of −n to n when interpolation processing is performed.

Information of pixel values stored in the first and second register elements 501 and 502 is inputted into a first comparator 511. When the pixel value stored in the first register element 501 is larger than the pixel value stored in the second register element 502, the first comparator 511 outputs an on-signal. This output is inverted by an inverter 511a, so that the inverted output is outputted to a first AND gate 513.

Information of pixel values stored in the second and third register elements 502 and 503 is inputted into a second comparator 512. When the pixel value stored in the second register element 502 is larger than the pixel value stored in the third register element 503, the second comparator 512 outputs an on-signal to the first AND gate 513.

When both the input signals are on, the first AND gate 513 outputs an on-signal to an adder 52. An output signal of a logic circuit 521 which outputs an on-signal when the argument (hereinafter referred to as "object argument") of the array variable D[x] for the pixel value stored in the second register element 502 is in a range of −n+1 to −2 or in a range of 2 to n−1 is inputted into an enable input of the adder 52. An output of a logic circuit 522 which outputs an on-signal when the object argument is −1 or n is inputted into a reset input of the adder 52.

By this configuration, the adder 52 outputs a count value of on-signals inputted from the first AND gate 513 while the object argument changes from −n+1 to −2 and the argument x changes from 2 to n−1. An output of the adder 52 is inputted into a Pf register 531 and a Pr register 532.

Besides the output of the adder 52, an output signal of a logic circuit 533 which outputs an on-signal when the object argument is −2 is inputted, as a clock signal for latching the output of the adder 52, into the Pf register 531. As a result, the Pf register 531 stores the output of the adder 52 at the object argument of −2, and outputs the stored signal (count value of the adder 52) to a third comparator 541 and a fourth comparator 542.

Besides the output of the adder 52, an output signal of a logic circuit 534 which outputs an on-signal when the object argument is n is inputted, as a clock signal for latching the output of the adder 52, into the Pr register 532. As a result, the Pr register 532 stores the output of the adder 52 at the object argument of n, and outputs the stored signal (count value of the adder 52) to a fifth comparator 543 and a sixth comparator 544.

An output signal of a first threshold output circuit 535 which outputs a signal corresponding to the first threshold Pt1 in the first embodiment is inputted into the third and fifth comparators 541 and 543. An output signal of a second threshold output circuit 536 which outputs a signal corresponding to the second threshold Pt2 in the first embodiment is inputted into the fourth and sixth comparators 542 and 544.

When the output signal of the Pf register 531 is larger than the output signal of the first threshold output circuit 535, the third comparator 541 outputs an on-signal. When the output signal of the Pf register 531 is larger than the output signal of the second threshold output circuit 536, the fourth comparator 542 outputs an on-signal.

When the output signal of the Pr register 532 is larger than the output signal of the first threshold output circuit 535, the fifth comparator 543 outputs an on-signal. When the output signal of the Pr register 532 is larger than the output signal of the second threshold output circuit 536, the sixth comparator 544 outputs an on-signal.

Output signals of the third and fifth comparators 541 and 543 are inputted into a second AND gate 55. An output signal of the fourth comparator 542 is inverted by an inverter 542a, so that the inverted signal is inputted into the second AND gate 55. An output signal of the sixth comparator 544 is inverted by an inverter 544a, so that the inverted signal is inputted into the second AND gate 55. When all the input signals are on, the second AND gate 55 outputs an on-signal to a third selector circuit 573 and a fourth selector circuit 574 which will be described later.

The output signal of the Pf register 531 is also inputted into a first address translation circuit 561. The first address translation circuit 561 outputs a signal of the quotient obtained by dividing (n−2) by the output value of the Pf register 531. This quotient is equivalent to the cycle of change in pixel values of pixels. Incidentally, the figures below the decimal point are omitted so that the quotient is rounded down to the whole number.

Similarly, the output signal of the Pr register 532 is also inputted into a second address translation circuit 562. The second address translation circuit 562 outputs a signal of the quotient obtained by dividing (n−2) by the output value of the Pr register 532. This quotient is equivalent to the cycle of change in pixel values of pixels. Incidentally, the figures below the decimal point are omitted so that the quotient is rounded down to the whole number.

An output of the first address translation circuit 561 is inputted into a first selector circuit 571. The first selector circuit 571 is formed so that the first selector circuit 571 receives signals from the respective register elements of the shift register 50, extracts a signal inputted from a register element corresponding to the output of the first address translation circuit 561 in the respective register elements of the shift register 50, and outputs the extracted signal.

An output of the second address translation circuit 562 is inputted into a second selector circuit 572. The second selector circuit 572 is formed so that the second selector circuit 572 receives signals from the respective register elements of the shift register 50, extracts a signal inputted from a register element corresponding to the output of the second address translation circuit 562 in the respective register elements of the shift register 50, and outputs the extracted signal.

An output signal of the first selector circuit 571 is inputted into the third selector circuit 573. The third selector circuit 573 also receives a signal of D[−1] as an input from a corresponding register element of the shift register 50.

An output signal of the second selector circuit 572 is inputted into the fourth selector circuit 574. The fourth selector circuit 574 also receives a signal of D[1] as an input from a corresponding register element of the shift register 50.

An output signal of the second AND gate 55 is inputted as a selection signal into the third and fourth selector circuits 573 and 574. When the selection signal is on, the third selector circuit 573 selects an input signal from the first selector circuit 571 and outputs the input signal. On the other hand, when the selection signal is off, the third selector circuit 573 selects a signal corresponding to D[−1] and outputs the selected signal.

When the selection signal is on, the fourth selector circuit 574 selects an input signal from the second selector circuit 572 and outputs the input signal. On the other hand, when the selection signal is off, the fourth selector circuit 574 selects a signal corresponding to D[1] and outputs the selected signal. Output signals of the third and fourth selector circuits 573 and 574 are given to an adder 58.

The adder 58 adds the pixel value indicated by the output signal of the third selector circuit 573 and the pixel value indicated by the output signal of the fourth selector circuit 574, and outputs a result of the addition to a divider 59. The divider 59 outputs information of the quotient obtained by dividing the sum as the addition result inputted from the adder 58 by 2. The output value is a pixel value of the interpolated pixel. The output value is stored as D[0] in a corresponding register element of the shift register 50.

Among the constituent elements of the aforementioned circuit, the first comparator 511, the second comparator 512, the first AND gate 513, the adder 52, the Pf register 531, the Pr register 532, the third to sixth comparators 541 to 544 and the second AND gate 55 are provided as an example of a determination unit.

The first address translation circuit 561 and the second address translation circuit 562 are provided as an example of a cycle calculation unit. The first selector circuit 571, the second selector circuit 572, the third selector circuit 573, the fourth selector circuit 574, the adder 58 and the divider 59 are provided as an example of an interpolating unit.

The pixel interpolating device 43A configured as described above according to this embodiment executes the same operation as the pixel interpolating device 43 according to the first embodiment but at a higher speed. The pixel interpolating device 43A may be modified in the same manner as each modification of the first embodiment.

Next, a third embodiment of the invention will be described with reference to FIG. 8.

Figure 8:
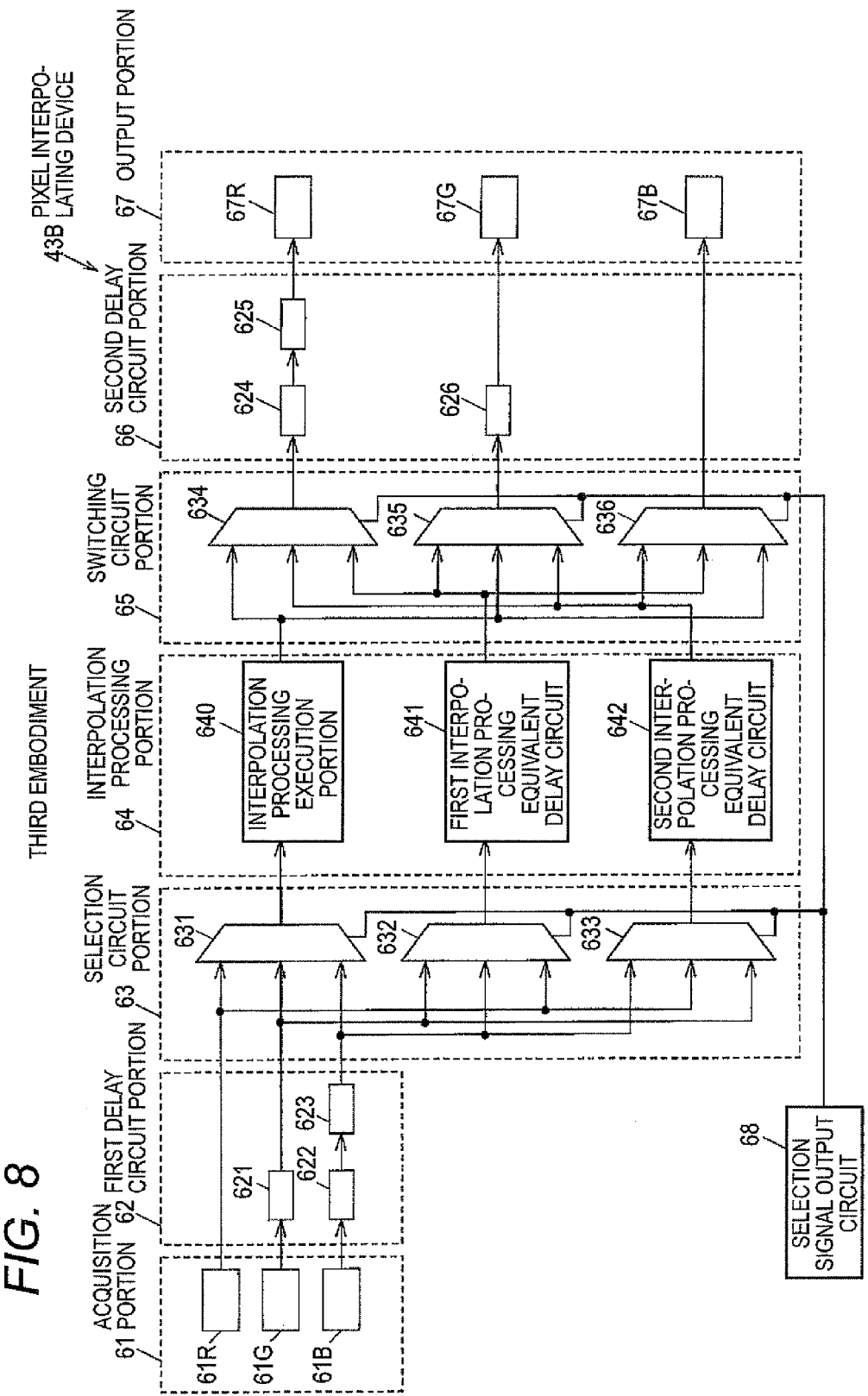
FIG. 8 is a diagram showing an example of configuration of a pixel interpolating device according to a third embodiment of the invention.

FIG. 8 is a diagram showing an example of schematic configuration of a pixel interpolating device 43B according to this embodiment.

Although the first and second embodiments have been described in the case where each photoelectric conversion element array has a line of photoelectric conversion elements, this embodiment will be described in the case where each photoelectric conversion element array having three photoelectric conversion element lines, that is, a first photoelectric conversion element line for reading red, a second photoelectric conversion element line for reading green and a third photoelectric conversion element line for reading blue with red, green and blue filters arranged between the document and the photoelectric conversion element array is used.

When this photoelectric conversion element array is used, pixel values indicating results of an image of the document read by the first to third photoelectric conversion element lines are delivered simultaneously to the pixel interpolating device 43B. This embodiment is configured so that one interpolation processing execution portion 640 is provided to perform interpolation processing, and that settings of pixel values of interpolated pixels for the three colors (i.e. red, green and blue) are executed successively by the interpolation processing execution portion 640 while processing timing is shifted. The other configuration is the same as that of the first embodiment.

As shown in FIG. 8, the pixel interpolating device 43B includes: an acquisition portion 61 which acquires pixel values for respective colors; a first delay circuit portion 62 which delays transmission of information of pixel values; an interpolation processing portion 64 which performs interpolation processing; a selection circuit portion 63 which selects information of pixel values for respective colors and supplies the information to the interpolation processing portion 64 successively; a switching circuit portion 65 which switches a route of transmission of information of pixel values subjected to interpolation processing; a second delay circuit portion 66 which communizes delay periods of transmission of information of pixel values for respective colors; an output portion 67 which outputs information of pixel values for respective colors; and a selection signal output circuit 68 which controls the selection circuit portion 63 and the switching circuit portion 65.

The acquisition portion 61 has: a first acquisition portion 61R which acquires pixel values of red pixels; a second acquisition portion 61G which acquires pixel values of green pixels; and a third acquisition portion 61B which acquires pixel values of blue pixels.

The first delay circuit portion 62 delays transmission of pixel values of respective color pixels acquired by the acquisition portion 61. The delay period varies according to each color. Incidentally, the delay period is a time of zero or more. The first delay circuit portion 62 can be formed so that there is no delay (delay period=0) for one color.

Specifically, the first delay circuit portion 62 has: a first delay circuit 621 which delays transmission of information outputted from the second acquisition portion 61G; and second and third delay circuits 622 and 623 which delay transmission of information outputted from the third acquisition portion 61B. The delay periods due to the first to third delay circuits 621, 622 and 623 are set to be equal to one another. The delay period is set to be not shorter than the time required for interpolation processing executed by the interpolation processing portion 64.

The selection circuit portion 63 has first, second and third selector circuits 631, 632 and 633. Each of the first to third selector circuits 631, 632 and 633 has three (first, second and third) input ports, and a selection signal input port. Each of the first to third selector circuits 631, 632 and 633 is formed so that a signal of one input port selected from the first to third input ports in accordance with a selection signal inputted into the selection signal input port is outputted.

An output of the first acquisition portion 61R is inputted into the first input port of the first selector circuit 631, the third input port of the second selector circuit 632 and the second input port of the third selector circuit 633. An output of the first delay circuit 621 is inputted into the second input port of the first selector circuit 631, the first input port of the second selector circuit 632 and the third input port of the third selector circuit 633. An output of the third delay circuit 623 is inputted into the third input port of the first selector circuit 631, the second input port of the second selector circuit 632 and the first input port of the third selector circuit 633.

The interpolation processing portion 64 has: an interpolation processing execution portion 640 which executes interpolation processing; a first interpolation processing equivalent delay circuit 641; and a second interpolation processing equivalent delay circuit 642. The interpolation processing execution portion 640 executes settings of pixel values of interpolated pixels based on the acquired pixel values of the read pixels. For example, the interpolation processing execution portion 640 has respective circuit constituent elements shown in FIG. 7.

The delay period of the first interpolation processing equivalent delay circuit 641 and the delay period of the second interpolation processing equivalent delay circuit 642 are set to be equal to the time required for interpolation processing executed by the interpolation processing execution portion 640.

An output signal of the first selector circuit 631 is inputted into the interpolation processing execution portion 640. An output signal of the second selector circuit 632 is inputted into the first interpolation processing equivalent delay circuit 641. An output signal of the third selector circuit 633 is inputted into the second interpolation processing equivalent delay circuit 642.

The switching circuit portion 65 has fourth to sixth selector circuits 634, 635 and 636. Outputs of the interpolation processing execution portion 640, the first interpolation processing equivalent delay circuit 641 and the second interpolation processing equivalent delay circuit 642 are inputted into the fourth to sixth selector circuits 634, 635 and 636. The fourth to sixth selector circuits 634, 635 and 636 have the same configurations and functions as those of the first to third selector circuits 631, 632 and 633.

An output of the interpolation processing execution portion 640 is inputted into a first input port of the fourth selector circuit 634, a second input port of the fifth selector circuit 635 and a third input port of the sixth selector circuit 636. An output of the first interpolation processing equivalent delay circuit 641 is inputted into a third input port of the fourth selector circuit 634, a first input port of the fifth selector circuit 635 and a second input port of the sixth selector circuit 636. An output of the second interpolation processing equivalent delay circuit 642 is inputted into a second input port of the fourth selector circuit 634, a third input port of the fifth selector circuit 635 and a first input port of the sixth selector circuit 636.

The second delay circuit portion 66 has fourth to sixth delay circuits 624 to 626. The fourth and fifth delay circuits 624 and 625 delay transmission of information outputted from the fourth selector circuit 634. The sixth delay circuit 626 delays transmission of information outputted from the fifth selector circuit 635. The delay periods due to the fourth to sixth delay circuits 624 to 626 are set to be equal to one another. The delay period is set to be not shorter than the time required for interpolation processing executed by the interpolation processing portion 64.

The output portion 67 has: a first output portion 67R which outputs pixel values of red pixels; a second output portion 67G which outputs pixel values of green pixels; and a third output portion 67B which outputs pixel values of blue pixels.

An output of the fourth selector circuit 634 is inputted into the first output portion 67R through the fourth and fifth delay circuits 624 and 625. An output of the fifth selector circuit 635 is inputted into the second output portion 67G through the sixth delay circuit 626. An output of the sixth selector circuit 636 is inputted into the third output portion 67B without interposition of any delay circuit.

An output signal of the selection signal output circuit 68 is inputted into the respective selection signal input ports of the first to sixth selector circuits 631 to 636. The selection signal output circuit 68 switches from one of first to third selection signals to another at intervals of a predetermined time and outputs the switched signal. The first selection signal indicates that a signal of the first input port should be outputted. The second selection signal indicates that a signal of the second input port should be outputted. The third selection signal indicates that a signal of the third input port should be outputted. The interval of the time is set to be not shorter than the time required for interpolation processing executed by the interpolation processing execution portion 640.

Next, the operation of the pixel interpolating device 43B will be described with reference to FIG. 9.

Figure 9:
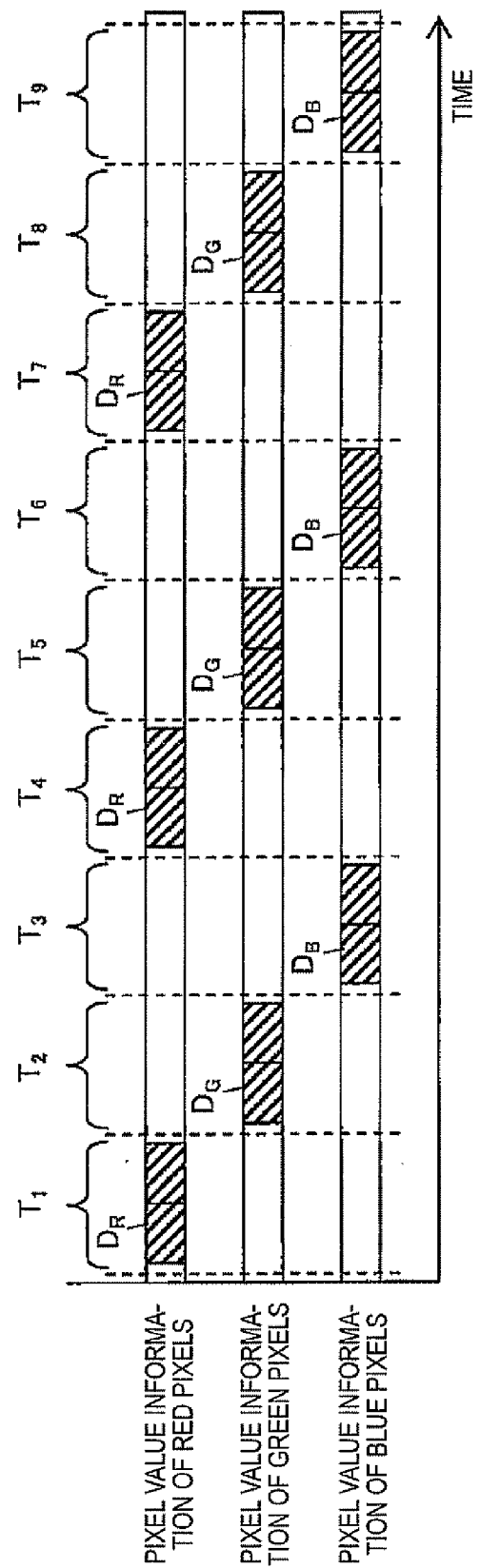
FIG. 9 is a view schematically showing an example of a flow of information of pixel values of red, green and blue pixels on an output side of a first delay circuit.

FIG. 9 is a view schematically showing an example of a flow of information of pixel values of red, green and blue pixels on the output side of the first delay circuit 62.

Although information of pixel values of red, green and blue pixels is supplied simultaneously to the pixel interpolating device 43B, transmission of information of pixel values of green pixels is delayed for one stage (delay period of each delay circuit) by a delaying operation of the first delay circuit 621. Moreover, transmission of information of pixel values of blue pixels is delayed for two stages by a delaying operation of the second and third delay circuits 622 and 623.

In FIG. 9, the hatched portions $D_R$, $D_G$ and $D_B$ show information of pixel values of pixels in the periphery of a boundary between adjacent photoelectric conversion element arrays. The broken line shows timing of switching information inputted into the interpolation processing execution portion 640 in accordance with change in the output signal of the selection signal output circuit 68.

Although the pixel value of an interpolated pixel corresponding to a position between a pair of adjacent photoelectric conversion element arrays is set by interpolation processing executed by the interpolation processing execution portion 640, time differences in timing of inputting information of pixel values of read pixels in the periphery of the interpolated pixel into the interpolation processing execution portion 640 are generated by the first delay circuit portion 62.

As shown in FIG. 9, in a first term $T_1$, red pixel information $D_R$ in the periphery of a boundary between photoelectric conversion element arrays is inputted into the interpolation processing execution portion 640. When a second term $T_2$ has come based on change of the output signal of the selection signal output circuit 68, green pixel information $D_G$ in the periphery of the boundary between the photoelectric conversion element arrays is inputted into the interpolation processing execution portion 640. When a third term $T_3$ has come based on further change of the output signal of the selection signal output circuit 68, blue pixel information $D_B$ in the periphery of the boundary between the photoelectric conversion element arrays is inputted into the interpolation processing execution portion 640. Such an operation is repeated as follows. In a fourth term $T_4$ and a seventh $T_7$, red pixel information $D_R$ in the periphery of the boundary is inputted into the interpolation processing execution portion 640. In a fifth term $T_5$ and an eighth term $T_8$, green pixel information $D_G$ in the periphery of the boundary is inputted into the interpolation processing execution portion 640. In a sixth term $T_6$ and a ninth term $T_9$, blue pixel information $D_B$ in the periphery of the boundary is inputted into the interpolation processing execution portion 640.

The switching circuit portion 65 is controlled by the selection signal output circuit 68 so that information of pixel values of respective color pixels subjected to interpolation processing is outputted from the first to third output portions 67R, 67G and 67B in accordance with the colors respectively. Variations in the delay periods of pixel value information of respective color pixels generated by the first delay circuit portion 62 are corrected by the second delay circuit portion 66.

As described above, in this embodiment, because pixel values of interpolated pixels for respective colors are set by one interpolation processing execution portion 640 which executes interpolation processing, the total circuit scale is reduced compared with the case where interpolation processing execution portions are provided for respective colors.

Incidentally, the invention is not limited to the aforementioned embodiments and may be modified variously without departing from the gist of the invention.

Although each of the aforementioned embodiments has been described in the case where an image of only a front surface 9a of a document 9 is read out, the pixel interpolating device according to any one of the embodiments may be applied to an image reading apparatus which can perform double-sided reading simultaneously in such a manner that a rear surface of the document 9 is read out by the image reading portion 10 and the image processing portion 4 according to any one of the aforementioned embodiments while the front surface 9a is read by an image reading portion having a reducing optical system using mirrors.

Although each of the aforementioned embodiments has been described in the ease where interpolation processing of interpolated pixels is executed after shading correction executed by the shading correction portion 42, this sequence may be reversed.

Although each of the aforementioned embodiments has been described in the case where the pixel interpolation processing program 432a is incorporated in the image reading apparatus 100, the invention is not limited thereto and the pixel interpolation processing program 432a may be stored in a storage device of a computer while the image reading portion 10, etc. may be provided separately from the computer. In this case, the pixel interpolation processing program 432a may be provided in a state where the pixel interpolation processing program 432a is stored in a storage medium such as a CD-ROM, or the pixel interpolation processing program 432a may be downloaded to the computer from a server device or the like connected to a network such as Internet.

All or part of the units in each of the aforementioned embodiments may be implemented by hardware such as ASIC. In addition, the steps described in each of the aforementioned embodiments may be exchanged, deleted or added.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pixel interpolating device comprising:
    a cycle calculation unit that calculates a cycle in change of pixel values of pixels in a document image obtained by reading a document by first and second photoelectric conversion element arrays each having a plurality of photoelectric conversion elements; and
    an interpolating unit that extracts from the pixels such pixels that a distance between each pixel and an interpolated pixel corresponding to a position between the first and second photoelectric conversion element arrays corresponds to the cycle calculated by the cycle calculation unit, and that interpolates a pixel value of the interpolated pixel based on pixel values of the extracted pixels.

2. The pixel interpolating device according to claim 1, wherein
    the interpolating unit extracts pixels corresponding to the cycle from pixels read by the first photoelectric conversion element array and from pixels read by the second photoelectric conversion element array, respectively, and
    the interpolating unit sets the pixel value of the interpolated pixel based on pixel values of the extracted pixels.

3. The pixel interpolating device according to claim 1, wherein
    the cycle calculation unit calculates the cycle based on the number of extreme values in pixel values of pixels in a peripheral portion between the first and second photoelectric conversion element arrays.

4. The pixel interpolating device according to claim 1, further comprising:
    a delay circuit portion that delays transmission of information of pixel values of pixels corresponding to each of input colors for a delay period varying according to the color; wherein
    the cycle calculation unit interpolates pixel values of interpolated pixels corresponding to the colors in ascending order of the delay period.

5. An image reading apparatus comprising:
    a pixel interpolating device according to claim 1;
    a light source that irradiates a document with light beams;
    first and second photoelectric conversion element arrays each of which has a plurality of photoelectric conversion elements outputting signals in accordance with intensity of light beams reflected on the document; and
    a supply portion that sets pixel values of the pixels for an image of the document based on the output signals of the photoelectric conversion elements of the first and second photoelectric conversion element arrays, and that supplies information of the set pixel values to the pixel interpolating device.

6. A pixel interpolating method comprising:
    calculating a cycle in change of pixel values of pixels in a document image obtained by reading a document by first and second photoelectric conversion element arrays each having a plurality of photoelectric conversion elements;
    extracting from the pixels such pixels which a distance between each pixel and an interpolated pixel corresponding to a position between the first and second photoelectric conversion element arrays corresponds to the calculated cycle; and
    interpolating a pixel value of the interpolated pixel based on pixel values of the extracted pixels.

7. A non-transitory computer-readable medium storing a program that causes a computer to execute pixel interpolating, the pixel interpolating comprising:
    calculating a cycle in change of pixel values of pixels in a document image obtained by reading a document by first and second photoelectric conversion element arrays each having a plurality of photoelectric conversion elements;
    extracting from the pixels such pixels which a distance between each pixel and an interpolated pixel corresponding to a position between the first and second photoelectric conversion element arrays corresponds to the calculated cycle; and
    interpolating a pixel value of the interpolated pixel based on pixel values of the extracted pixels.

* * * * *